United States Patent

[11] 3,634,139

| [72] | Inventor | Carl A. Reiser |
| | | Glastonbury, Conn. |
| [21] | Appl. No. | 817,439 |
| [22] | Filed | Apr. 18, 1969 |
| [45] | Patented | Jan. 11, 1972 |
| [73] | Assignee | United Aircraft Corporation |
| | | East Hartford, Conn. |

[54] EXTERNAL RESERVOIR AND INTERNAL POOL FUEL CELL SYSTEM AND METHOD OF OPERATION
5 Claims, 2 Drawing Figs.

[52] U.S. Cl..................................................... 136/86 R, 136/86 E
[51] Int. Cl........................................................H01m 27/02
[50] Field of Search............................................ 136/86

[56] References Cited
UNITED STATES PATENTS

| 3,372,060 | 3/1968 | Platner.......................... | 136/86 |
| 3,391,028 | 7/1968 | Vose ............................. | 136/86 |
| 3,458,357 | 7/1969 | Truitt............................ | 136/86 |

*Primary Examiner*—Allen B. Curtis
*Attorney*—Laurence A. Savage

ABSTRACT: A fuel cell module is disclosed for use with aqueous electrolyte fuel cells with provisions for accepting large electrolyte volume changes which occur as a result of changes in ambient conditions and/or power output. The module incorporates internal cell pools combined through an internal manifold system to an external electrolyte reservoir. The advantage of this particular arrangement lies in its ability to provide broad tolerance to electrolyte volume changes and is particularly suitable for use with compact fuel cells having lightweight electrodes.

INVENTOR
CARL A. REISER
BY Edmund C. Meisinger
ATTORNEY

EXTERNAL RESERVOIR AND INTERNAL POOL FUEL CELL SYSTEM AND METHOD OF OPERATION

BACKGROUND OF THE INVENTION

This invention relates to fuel cells and more specifically relates to fuel cells modules combining internal cell pools with an external electrolyte reservoir.

Fuel cells with aqueous electrolytes require reservoirs to accept electrolyte volume changes which occur during operation. Generally, the larger the reservoir, the simpler the controls become. In early cells, electrolyte volume changes resulted in electrolyte interface movement within sinter electrodes. In screen anode and screen cathode cells, no reservoir was provided. The required water content controls became so complicated as to be impractical. In other cells, electrolyte tolerance was increased by using sinter anodes and screen cathodes. The maximum electrolyte volume variations increased but these cells were larger, heavier and more costly than screen-electrode-type cells. A particular disadvantage of early sinter electrodes lies in the fact that electrolyte interface moves within the structure, and it is necessary to disperse a catalyst throughout the thickness of the electrode. Consequently, sinter electrodes require a greater amount of catalyst resulting in increased costs.

Pooling cells have been in use for several years. These cells generally use the bottom of one or both gas compartments as a reservoir. The disadvantage in these systems is that the cell stack size and electrolyte volume variations are limited to a large extent by the size of the pool. External reservoir stacks have only been used with free electrolyte-type cells with unusually complicated delta pressure controls, and wet-proofed or dual porosity electrodes are required.

SUMMARY OF THE INVENTION

It is an object of this invention to provide a fuel cell module having a broad tolerance to electrolyte volume changes.

Another object of this invention is the provision of a fuel cell stack having a plurality of cells each having an internal electrolyte pool interconnected through a manifold to an external reservoir to accommodate electrolyte volume changes. An aspect of this invention lies in the combination of internal cell pools manifolded together and connected to an external reservoir in conjunction with a matrix fuel cell having lightweight electrodes.

Another object of this invention is the provision of an external reservoir and an internal electrolyte manifold to electrolyte pools associated with each cell of a matrix type fuel cell module.

It has now been found that the foregoing and related objects and advantages may be readily obtained in a novel fuel cell module design. In accordance with this invention, a plurality of matrix-type cells are incorporated into a fuel cell stack or module. Separate electrolyte pools are provided at the bottom of each cell and the matrix extends into the electrolyte pool. Each pool in connected through a manifold to an external reservoir so that all electrolyte volume changes may be absorbed by the external reservoir due to electrolyte flow through the manifold. As a result, the module can be readily adapted to various installations simply by varying the volume of the external reservoir.

DESCRIPTION OF THE PREFERRED EMBODIMENT

Figure 1:
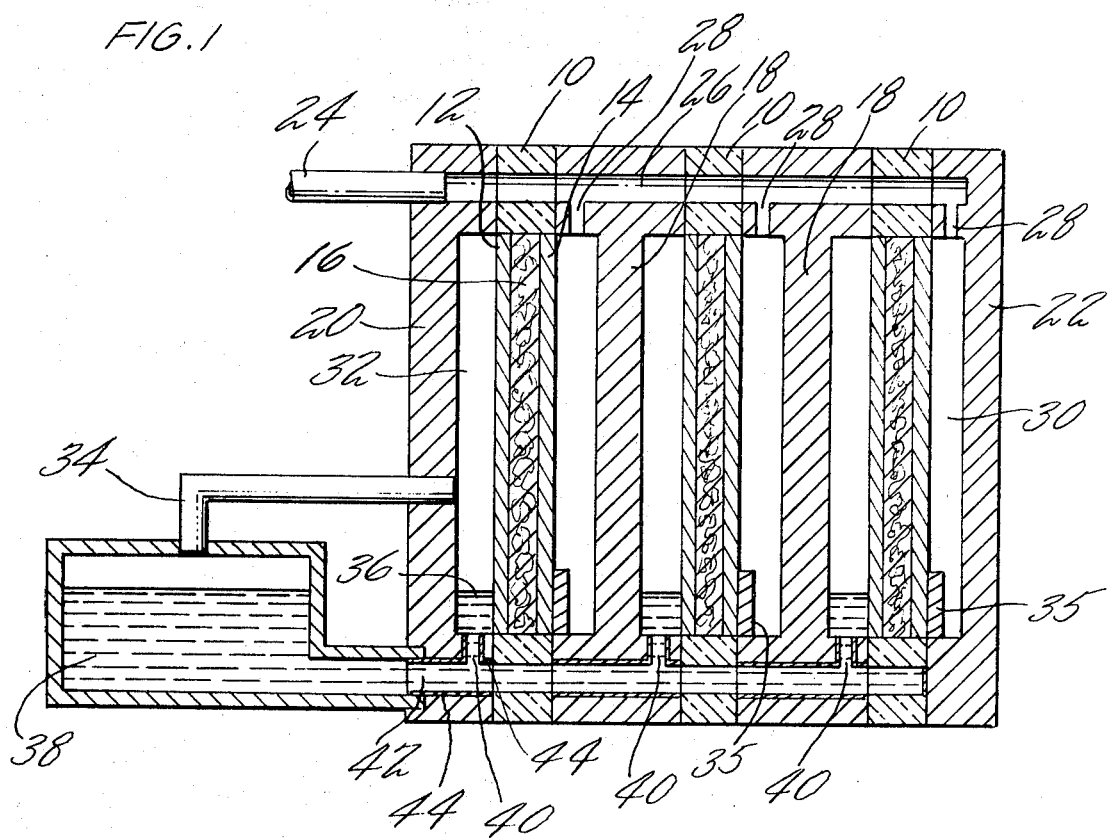
FIG. 1 is a schematic view of a fuel cell pooling stack incorporating an internal manifold and an external electrolyte reservoir.

Referring to FIG. 1, the fuel cell stack has a plurality of single cells consisting of spacers 10, anodes 12 and cathodes 14 and matrices 16 sandwiched therebetween. Interposed between the cells are support plates 18 which, in combination with the end plates 20 and 22, form reactant gas compartments 30 and 32 behind the electrodes 12 and 14. In the construction shown, a typical air reactant supply conduit 24 is connected to passage 26 in the peripheral flanges of the stack components. Supply ports 28 are shown to each cathode compartment 30 for directing reactant air to each cathode. A similar passage (not shown) is provided for the direction of the fuel gas to the anode compartments 32. Passages may be provided for the exhaust of the reactant gases. The end plate 20 and the support plates 18 enclose internal electrolyte pools 36 in the fuel gas compartments. The electrolyte pools 36 are connected through branch ports 40 in an internal electrolyte manifold 42 to an external reservoir 38.

The electrolyte level between the internal pools and the external reservoir is maintained through the use of conduit 34 connecting the fuel gas compartment and the electrolyte reservoir thereby maintaining the pressure balance on the electrolyte. The capillary potential of the matrix and of the anodes is such that the electrolyte will be absorbed whenever needed within the operative portions of the fuel cell and will be retained therein. The cell will operate at favorable conditions regardless of the actual quantity of electrolyte within the cell. Further, as operating conditions change and as water is generated in the fuel cell, the excess electrolyte may be forced out through the electrodes and drained into the pool; and the excess will be accepted by the electrolyte reservoir. If the electrolyte buildup is slow, electrolyte passes down through the matrix and passes through the bottom portion of the anode and into the pool in the anode compartment. An electrolyte impervious boot 35 may be provided to prevent electrolyte from passing into the cathode compartments. Thus, this stack arrangement compensates for electrolyte volume changes.

Between the electrodes is the matrix 16 holding the electrolyte which may be, for example, an 85 percent aqueous solution of phosphoric acid. The matrix is made of an acid-resistant material such as fiber glass or tantalum-oxide cloth. The matrix pore size and porosity is selected to wick electrolyte up into the operative portions of the cell, and provide a gastight bubble pressure barrier between the reactant gas compartments. Further, the matrix assists in the maintenance of electrode spacing resulting in reduced electrode separation and lower internal cell resistance. The electrodes 12 and 14 may be the conventional lightweight electrodes, for example, the catalyzed impregnated screen type as disclosed in U.S. Pat. No. 3,411,954 to Richman. Generally, the electrodes used in compact cells are structures having a screen, a felt-metal, a carbon paper or similar base structure. The electrodes associated with the pools typically have a hydrophilic micropore volume containing catalysts and a hydrophobic macropore volume and are characterized by the relatively thin flexible structure.

In a multicell fuel cell stack, there are current paths to each cell through the common electrolyte manifold. Electrolyte is a good ionic conductor and leakage current will flow within the electrolyte system from point to point where there is a difference in potential. Leakage currents can be minimized by proper manifold design. For example, by making the electrolyte branch ports 40 small even though the manifold diameter is relatively large, leakage current can be neglected. However, if these ports are made too small, the electrolyte flow between the pools and the reservoir will be retarded. It has been found that ports of about one-tenth of an inch in diameter are acceptable and that manifold diameters of about one-eighth of an inch in diameter are acceptable.

If proper insulation is applied to all electrically conductive surfaces in the manifold system, there will be no gas evolution within the manifold. Since the spacers 10 are nonconductive, no coating is required on the internal electrolyte passages in the spacers. However, a nonconductive coating 44 is necessary on the end plate 20 and on the support plates 18 and on the end plate 22.

Figure 2:
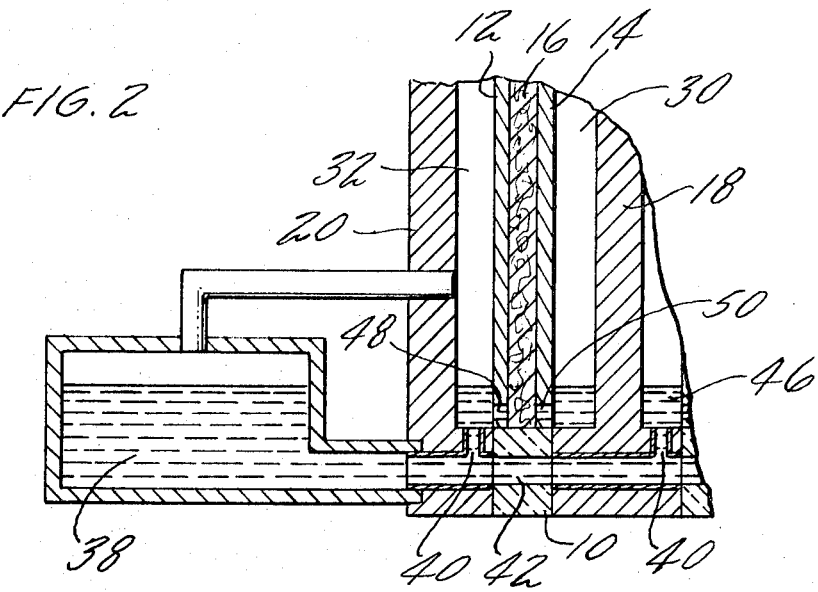
FIG. 2 shows a pooling cell incorporating a pool in both gas compartments.

Heat may be removed from the fuel cell and probably be conduction through the support plates and end plates to external fins for transfer to cooling air in well-known fashion. While the system has been shown and described with respect to electrolyte pools 36 at the bottom of the fuel gas compartments, it is evident that pools 46 may also be provided in the air compartments as shown in FIG. 2. Openings 48 and/or 50 may be provided in the electrodes to facilitate electrolyte flow through the electrodes. In the anode pool and cathode pool arrangement, both electrodes would be waterproofed and characterized by the hydrophilic micropore volume and the hydrophobic macropore volume.

The advantage of this system lies in its ability to accommodate large electrolyte volume changes. This cell design allows the development of a fuel cell stack which may be used for a variety of applications simply by varying the volume of the external reservoir in order to provide the required electrolyte volume variation tolerance.

The operating tolerance of a fuel cell is generally regarded as the ability of the cell to accept changes in electrolyte volume which result from changes in temperature, reactant flow, electrical load, or water removal rate without affecting significantly the cell performance. A volume change tolerance as high as 500 percent is desirable so that simplified control systems may be used. In order to achieve such high volume tolerances, an electrolyte pool has been incorporated in the module to supply extra electrolyte to the cells by wicking action. The electrolyte transfer rate between the cell and the pool is critical. Tests have been made with an internal pool and an external reservoir and have shown that the tolerance range was limited only by the reservoir capacity. Electrolyte volume changes of at least 350 percent have been easily demonstrated. Future tests will show that volume changes of 500 percent can be provided in matrix cells with lightweight electrodes.

Although the invention has been shown and described with respect to a preferred embodiment, it should be understood by those skilled in the art that various changes and omissions in the form and detail may be made herein without departing from the spirit and scope of this invention.

I claim:

1. An aqueous electrolyte fuel cell module comprising:
    a plurality of fuel cells each having spaced electrodes and a matrix for holding electrolyte sandwiched therebetween;
    means for directing reactant gases to the gas compartments at the sides of the electrodes opposite the matrix;
    a chamber for holding an electrolyte pool disposed at the bottom of each cell and the corresponding cell matrix extending into the electrolyte pool; said electrolyte pool having a portion communicating with at least one gas compartment, the electrode between the matrix and the pool being characterized by a hydrophilic micropore volume and a hydrophobic macropore volume, at least one electrode having a porosity sufficient to allow said electrolyte to pass therethrough to said matrix;
    a nonconductive electrolyte manifold interconnecting the cell pools through small branch ports in each cell; and
    an external electrolyte reservoir connected to the manifold to compensate for electrolyte volume changes within the cells.

2. A module as in claim 1, wherein the electrode between the matrix and the pool incorporates openings to facilitate electrolyte flow through the electrode.

3. A module as in claim 2, including means for maintaining the pressure balance between electrolyte pools and the electrolyte reservoir.

4. A module as in claim 3, wherein the electrolyte manifold is an internal manifold and, including an electrolyte impervious boot, is disposed behind the electrode in the gas compartment opposite the pool.

5. In matrix fuel cell modules having a plurality of cells each having at least one electrode with a hydrophilic micropore volume and a hydrophobic macropore volume and an aqueous electrolyte, the method of compensating for electrolyte volume changes which comprises:
    disposing the individual cell pools in the lower portion of at least one of the reactant gas compartments so that electrolyte may pass through an electrode having a hydrophilic micropore volume and a hydrophobic macropore volume;
    immersing the bottom portion of the matrix in an electrolyte pool disposed at the bottom of each cell;
    interconnecting the cell pools through a nonconductive internal electrolyte manifold designed to minimize ionic leakage current; and
    providing an electrolyte reservoir external to the cell stack and connecting the electrolyte manifold to the reservoir for absorbing and supplying electrolyte as electrolyte volume within the cells changes.

* * * * *